US008896426B1

(12) United States Patent
Mui

(10) Patent No.: US 8,896,426 B1
(45) Date of Patent: Nov. 25, 2014

(54) GRAPHICAL USER INTERFACE FOR PROGRAMMING UNIVERSAL REMOTE CONTROL DEVICES

(75) Inventor: Daniel SauFu Mui, San Jose, CA (US)

(73) Assignee: UEI Cayman Inc., Santa Ana, CA (US)

( * ) Notice: Subject to any disclaimer, the term of this patent is extended or adjusted under 35 U.S.C. 154(b) by 1371 days.

(21) Appl. No.: 11/704,669

(22) Filed: Feb. 9, 2007

(51) Int. Cl.
*G05B 11/01* (2006.01)

(52) U.S. Cl.
USPC ................ 340/12.23; 340/12.22; 340/426.14; 340/539.19; 340/10.51; 348/734; 341/176

(58) Field of Classification Search
CPC ........... G08C 2201/20; G08C 2201/21; G08C 2201/30; G08C 2201/92; H04N 21/42225; H04N 21/42226
USPC .................. 340/825, 539.19, 426.14, 426.35, 340/10.51, 7.39, 5.2, 5.21–5.25, 340/12.22–12.23; 348/734; 341/176; 725/46, 47
See application file for complete search history.

(56) References Cited

U.S. PATENT DOCUMENTS

| | | | | |
|---|---|---|---|---|
| 4,623,887 | A | 11/1986 | Welles, II | |
| 4,774,511 | A | 9/1988 | Rumbolt et al. | |
| 4,959,810 | A | 9/1990 | Darbee et al. | |
| 5,263,098 | A | 11/1993 | Horikami | |
| 5,481,256 | A | 1/1996 | Darbee et al. | |
| 5,515,052 | A | 5/1996 | Darbee | |
| 5,929,849 | A * | 7/1999 | Kikinis | 725/113 |
| 5,959,751 | A | 9/1999 | Darbee et al. | |
| 6,008,735 | A * | 12/1999 | Chiloyan et al. | 340/825.22 |
| 6,014,092 | A | 1/2000 | Darbee et al. | |
| 6,115,495 | A | 9/2000 | Tachikawa et al. | |
| 6,157,319 | A | 12/2000 | Johns et al. | |
| 6,211,856 | B1 | 4/2001 | Choi et al. | |
| 6,211,870 | B1 | 4/2001 | Foster | |
| 6,225,938 | B1 | 5/2001 | Hayes et al. | |
| 6,408,435 | B1 * | 6/2002 | Sato | 725/58 |
| 6,763,148 | B1 | 7/2004 | Stemberg et al. | |
| 6,774,813 | B2 * | 8/2004 | van Ee et al. | 340/825.69 |
| 6,952,496 | B2 | 10/2005 | Krumm | |
| 7,046,161 | B2 | 5/2006 | Hayes | |
| 7,653,212 | B2 * | 1/2010 | Haughawout et al. | 382/100 |
| 2001/0017615 | A1 | 8/2001 | Lin et al. | |
| 2001/0045819 | A1 | 11/2001 | Harris et al. | |
| 2002/0143805 | A1 | 10/2002 | Hayes et al. | |

(Continued)

FOREIGN PATENT DOCUMENTS

| | | | | |
|---|---|---|---|---|
| EP | 1578016 A1 | | 9/2005 | |
| WO | 2005/043484 | | 5/2005 | |
| WO | WO 2006125357 A1 | * | 11/2006 | G06F 1/26 |

*Primary Examiner* — Mohammad Ghayour
*Assistant Examiner* — Nay Tun
(74) *Attorney, Agent, or Firm* — Greenberg Traurig, LLP

(57) ABSTRACT

A universal remote control (URC) is programmed to control a particular type and make of electronic consumer device using a graphical user interface. A plurality of images is displayed on the user interface. Each image of the plurality of images is a digital photograph of an electronic consumer device or a remote control device usable to control the corresponding electronic consumer device. A user selects the digital photograph of the particular type and make of electronic consumer device or its corresponding remote control device. Codeset information associated with the selected device is transmitted to the URC such that the URC is programmed to control the selected device. If the codeset information is a codeset identifier, then it is displayed on the user interface. The user enters the codeset identifier into the URC such that the URC is programmed to control the selected device.

17 Claims, 5 Drawing Sheets

(56) References Cited

U.S. PATENT DOCUMENTS

| | | | |
|---|---|---|---|
| 2003/0025840 A1 | 2/2003 | Arling | |
| 2003/0095156 A1 | 5/2003 | Klein et al. | |
| 2003/0103088 A1 | 6/2003 | Dresti et al. | |
| 2003/0141987 A1 | 7/2003 | Hayes | |
| 2003/0189509 A1 | 10/2003 | Hayes et al. | |
| 2004/0003001 A1 | 1/2004 | Shimura | |
| 2004/0070491 A1 | 4/2004 | Huang et al. | |
| 2004/0257259 A1 | 12/2004 | Jindal | |
| 2005/0054289 A1 | 3/2005 | Salazar et al. | |
| 2006/0050142 A1 * | 3/2006 | Scott et al. | 348/14.05 |
| 2006/0227997 A1 | 10/2006 | Au et al. | |
| 2007/0080845 A1 | 4/2007 | Amand | |
| 2007/0096283 A1 | 5/2007 | Ljung et al. | |
| 2007/0100670 A1 * | 5/2007 | Celona et al. | 705/4 |
| 2007/0217650 A1 | 9/2007 | Ota et al. | |

* cited by examiner

GRAPHICAL USER INTERFACE FOR PROGRAMMING UNIVERSAL REMOTE CONTROL DEVICES

TECHNICAL FIELD

The disclosed embodiments relate to methods for programming a universal remote control device.

BACKGROUND

A universal remote control (URC) device transmits operational signals to control one or more electronic consumer devices such as TVs, VCRs; set-top boxes, audio home theatre systems, and CD/DVD players. A particular brand and make of electronic consumer device responds to operational signals containing a particular set of keycodes and performs the corresponding functions. In order to provide the functionality of a URC device, various types of keycodes are stored in codesets as a codeset database format. Each codeset is identified by a three digit codeset identifier associated with a particular brand and make of electronic consumer device. A URC device generally stores hundreds of codesets in a codeset database and is programmed to use one particular codeset to control one particular electronic consumer device.

Typically, a user is provided with a manual which includes a list of codeset identifiers corresponding to various electronic consumer devices. The user uses the manual to determine the correct codeset identifier corresponding to each electronic consumer device to be controlled, and then manually enters that codeset identifier into the URC device. This process is tedious and time-consuming. Further, if the manual of for the URC device is lost, then the user will have no way to program the URC device except by obtaining another manual (for example, from the manufacturer or by calling customer service center to get programming instructions). In addition, the codeset that may be selected for use by the URC device is limited to the codesets stored in the codeset database and provided in the manual. The URC device needs a relatively large amount of memory to store the entire codeset database and providing this large amount of memory increases the cost of the URC device.

Some URC devices have the capability of being programmed without requiring the user to enter a codeset identifier manually. This type of URC device is typically able to operate in an “auto search” mode such that the user does the auto search to find the desired codeset. However, auto search requires the user to take multiple programming steps to set up the auto search. Scanning through the entire codeset database is also time-consuming. Thus, a market exists for a universal remote control device that can be easily programmed, whereby a user will not need to determine a codeset identifier from a user manual.

SUMMARY

A universal remote control (URC) is programmed to control a particular type and make of electronic consumer device using a graphical user interface. In one embodiment, a user interface is displayed on a display screen. The user interface includes a plurality of images which are digital photographs of electronic consumer devices or remote control devices that are used to control the corresponding electronic consumer devices. The digital photographs are displayed in a prioritized order based on market popularity of the corresponding electronic consumer devices. A user views the display screen and selects the digital photograph of the particular type and make of electronic consumer device to be controlled (or its corresponding remote control device that is to be programmed). Codeset information associated with the selected device is outputted to the URC such that the URC is programmed to control the selected device.

An exemplary device comprises a memory, and a processor for executing an image-selection routine that displays a plurality of images on a display screen and outputs codeset information in response to a selection of one of the plurality of images. Each image of the plurality of images is a digital photograph of an electronic consumer device or a remote control device usable to control the electronic consumer device. In one example, the digital photographs of the plurality of images are stored in the memory as compressed digital image files. In another example, the digital photographs are received from a centralized location such as a central cable network.

The selected image corresponds to the particular type and make of electronic consumer device to be controlled by the URC. Codeset information is either a codeset identifier or a codeset associated with the selected device. In one embodiment, the codeset information is transmitted to the URC though an audio connection. By providing an audio connector in the URC, the URC can receive the codeset information across the audio connection and is automatically programmed to control the selected device. In another embodiment, the codeset information is a codeset identifier and is displayed on the display screen. The user views the codeset identifier (for example, a three-digit code) on the display screen, and then manually enters the codeset identifier into the URC to program the URC to control the selected device.

In one advantageous aspect, besides the codeset information, device information including device description information and device behavior characteristics information can also be transmitted to the URC through an audio connection.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
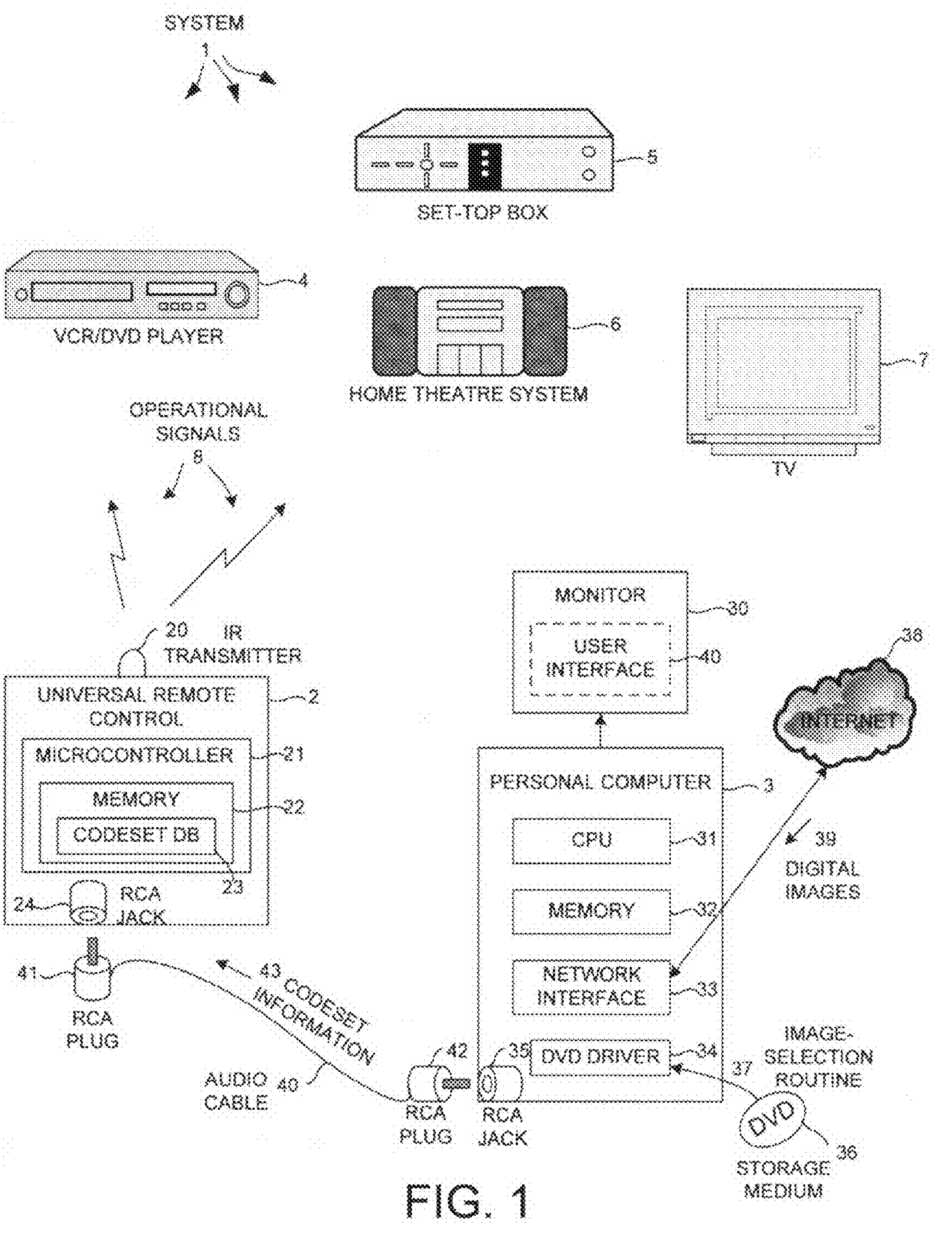
FIG. 1 illustrates a system in accordance with one novel aspect.

FIG. 1 is a diagram of a system 1 in accordance with one novel aspect. System 1 includes a universal remote control (URC) device 2, a personal computer (PC) 3 and several electronic consumer devices including: a VCR/DVD player 4, a set-top box 5, an audio home-theatre system 6, and a television 7. URC 2 emits operational signals 8 from an IR transmitter 20 to control electronic consumer devices. URC 2 includes a microcontroller 21, memory 22, and an RCA jack 24. Memory 22 contains a codeset database 23. (For additional information including examples of a codeset database and the content of a codeset and related information on how to use a codeset to generate an IR operational signal, see: U.S. patent application Ser. No. 10/777,023, entitled "Interactive Web-Based Codeset Selection and Development Tool", by Lee et al., filed Feb. 20, 2004 (the entire subject matter of which is incorporated herein by reference)). PC 3 is coupled to a monitor having a display screen 30. PC 3 is also coupled to a storage medium (for instance, a DVD disc as illustrated) 36. PC 3 is of typical PC construction and includes a CPU 31, memory 32, a network interface 33, a storage device (for instance, a DVD driver as illustrated) 34, and a audio OUT RCA jack 35. PC 3 is connected to a network (for instance, the internet as illustrated) 38. PC 3 receives digital images 39 from internet 38 through a network connection. PC 3 also transmits codeset information 43 to URC 2 through an audio cable 40. Audio cable 40 has two RCA plugs 41 and 42. RCA plug 41 is plugged into RCA jack 24 of URC 2, and RCA plug 42 is plugged into RCA jack 35 of PC 3.

FIG. 1 illustrates a method of using PC 3 to program URC 2 to control a particular brand and make of electronic consumer device. A user inserts DVD optical disc 36 into DVD driver 34 of PC 3. DVD disc 36 contains an image-selection routine 37 that is executable on CPU 31 of PC 3. PC 3 loads image-selection routine 37 from DVD disc 36. CPU 31 then executes image-selection routine 37 and displays a user interface 40 on display screen 30. The user then uses either a mouse or a keyboard or other user input device to interact with user interface 40 and to make selections.

Figure 2:
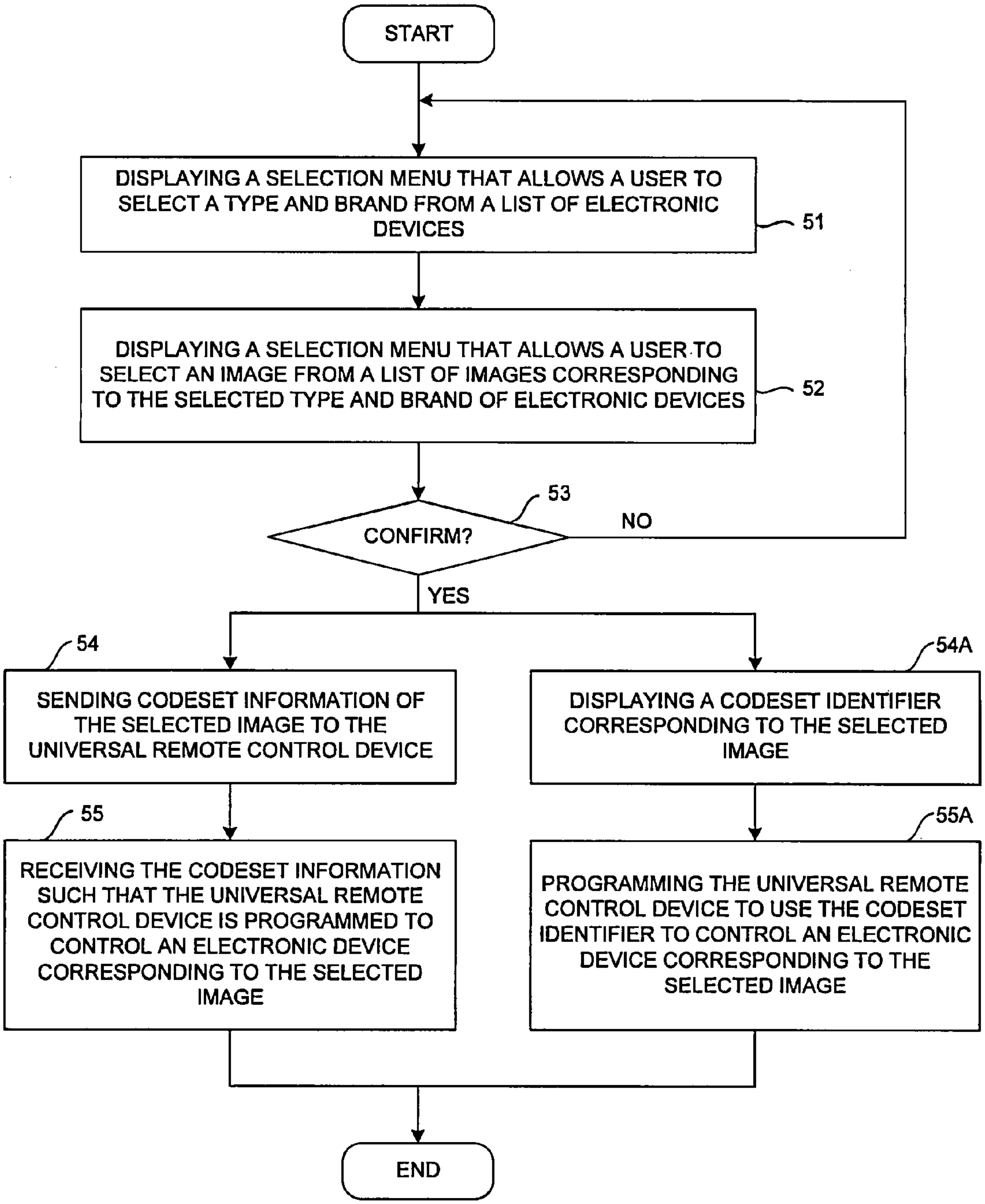
FIG. 2 is a flowchart of a method for programming a universal remote control device.
Figure 3:
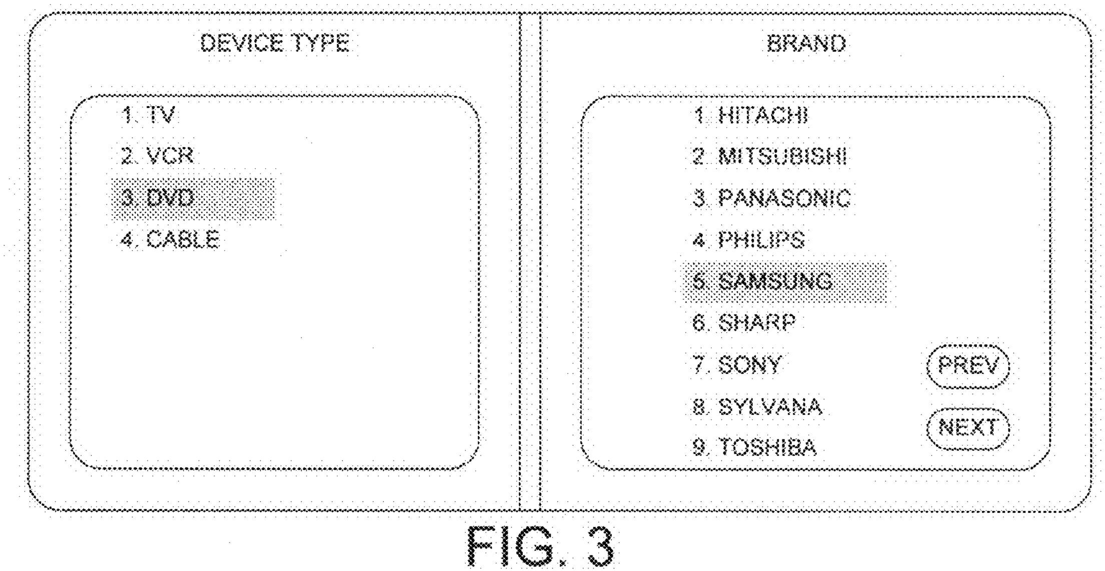
FIG. 3 is an example of a first selection menu of a user interface that is involved in the method for programming a universal remote control device.
Figure 3A:
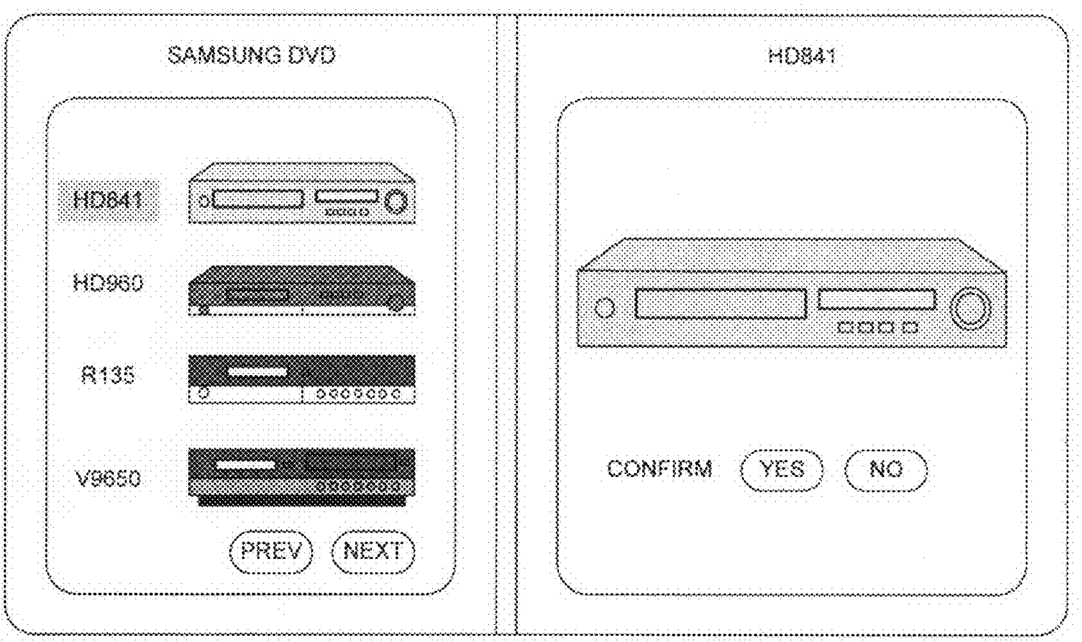
FIG. 3A is an example of a second selection menu of a user interface that is involved in the method for programming a universal remote control device.

FIG. 2 is a flow chart of a method of programming URC 2 illustrated in FIG. 1. FIG. 3 and FIG. 3A are examples of screen displays of user interface 40 that are involved in the method of FIG. 2. In the example of FIG. 3, CPU 31 executes image-selection routine 37 and displays a first selection menu of user interface 40 on display screen 30 (step 51 of FIG. 2). The first selection menu allows the user to select a device type from a list of device types such as TV, VCR, DVD, and cable set-top box. The first selection menu also allows the user to select a brand name from a list of manufacturers such as Hitachi, Mitsubishi, Panasonic, Philips and more. The user can select the "next" option to go to next page for more brand name selections, or select the "prev" option to go back to the previous page. As illustrated in FIG. 3, if the user wants to program URC 2 to control a SAMSUNG DVD device, then the user selects device type DVD and brand name SAMSUNG.

After the user selects device type DVD and brand name SAMSUNG, a second selection menu of user interface 40 is displayed on display screen 30 (step 52 of FIG. 2). In the example of FIG. 3A, the second selection menu displays photographs of all DVD devices that are manufactured by SAMSUNG. The user uses the user interface to select a photograph of the SAMSUNG DVD device to be controlled. The user browses through all the photographs by selecting the "prev" and "next" options. As illustrated in FIG. 3A, the user picks model HD841. The photograph of SAMSUNG DVD model HD841 is then enlarged for further verification. If the photograph of HD841 looks the same as the SAMSUNG DVD device to be controlled by URC 2, then the user confirms the selection of DVD HD841 by selecting the "yes" option (step 53 of FIG. 2).

Figure 4:
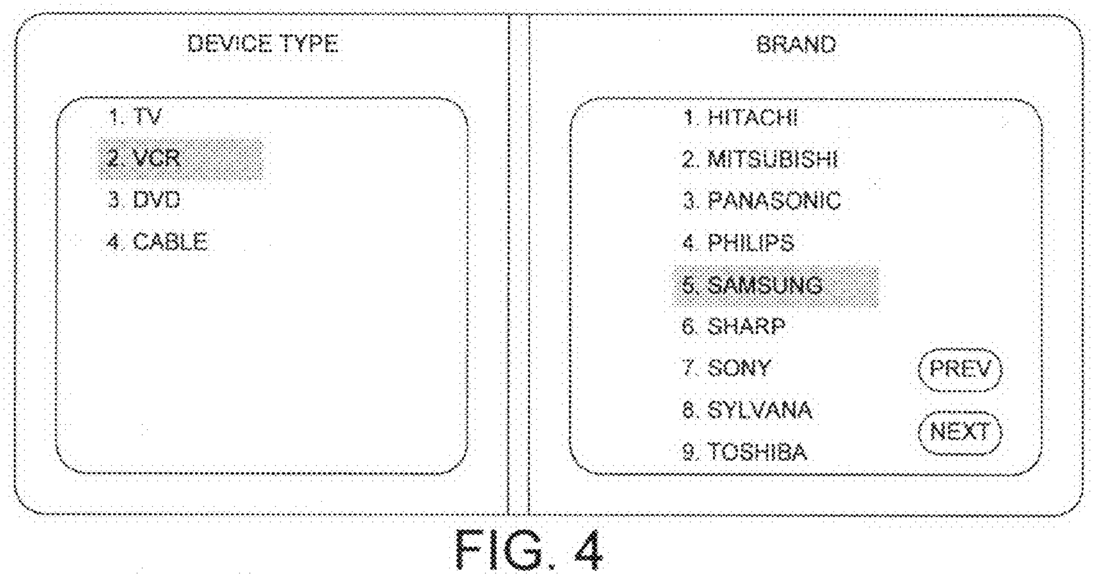
FIG. 4 is another example of a first selection menu of a user interface.
Figure 4A:
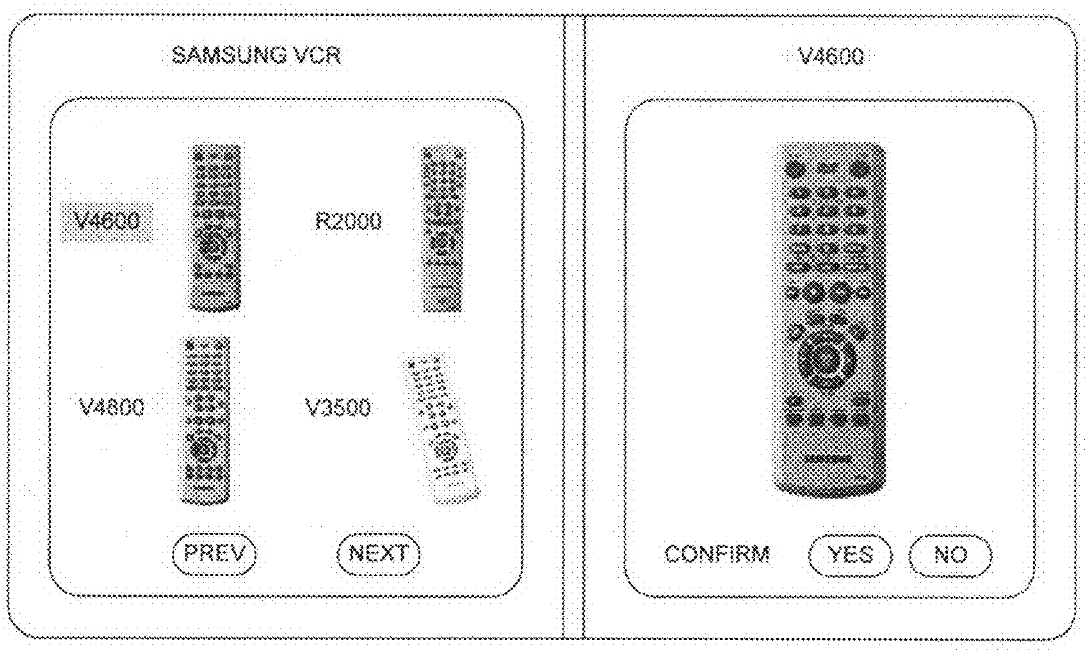
FIG. 4A is another example of a second selection menu of a user interface.

In the example of FIG. 3A, the images displayed in the second selection menu are photographs of the electronic consumer devices to be controlled by URC 2. In another example, the second selection menu displays photographs of the remote control devices that control the corresponding electronic consumer devices. As illustrated in FIG. 4 and FIG. 4A, after the user first selects device type VCR and brand name SAMSUNG from the first selection menu, the second selection menu displays photographs of all remote control devices that are used to control SAMSUNG VCR devices. This method is especially useful when the device type is TV. Televisions have similar appearances among different models. On the other hand, the appearances of remote control devices that control different models of televisions are usually different. Therefore, it may be easier for the user to pick and choose a particular brand and make of television by looking at the photographs of corresponding remote control devices of televisions.

There are thousands of electronic consumer devices and remote control devices available on the market. Each device is represented by a digital photograph which is stored as a digital image file. In the example of FIG. 1, digital images 39 represent the digital image files of all electronic consumer devices and remote control devices. A digital image file may, for example, be a JPEG file. As a result, the size of digital images 39 is quite large. The content of digital images 39 also changes rapidly as manufacturers continue to make new devices and to phase out obsolete old ones. In one example, digital images 39 are stored in DVD disc 36 and are then uploaded by CPU 31 through DVD driver 34 when the second selection menu is displayed on display screen 30. However, it is more cost effective to maintain and update digital images 39 in a central location such as an internet site. When the user selects a particular type and brand of electronic consumer devices from the first selection menu, PC 3 sends a request to download all digital image files of the selected type and brand of electronic consumer devices from the internet site. The downloaded digital photographs are then displayed on the second selection menu.

For some popular electronic device types and brands, there may be many pages of digital photographs to, be displayed. For instance, there may be dozens of different models of televisions are manufactured by Toshiba. It is therefore time consuming for the user to browse through all the pages of the second selection menu and select the right photograph. One way of improving the second selection menu is to prioritize each photograph based on market popularity of the corresponding device and to display the photograph in the order of its priority. Market popularity of a device is measured by number of unit sales, consumer rating, and other factors. The most popular models of the electronic consumer devices are then displayed first in the front page, thereby reducing the amount of time generally required by a user to select the proper digital photograph.

After the user confirms the selection of SAMSUNG DVD HD841, PC 3 sends (step 54 of FIG. 2) codeset information 43 of the selected electronic consumer device HD841 to URC 2. Codeset information 43 may be in various forms. In one example, codeset information 43 is a three-digit codeset identifier corresponding to SAMSUNG DVD HD841. URC 2 receives (step 55 of FIG. 2) the codeset identifier from PC 3. Microcontroller 21 of URC 2 then programs URC 2 to use a codeset corresponding to the received three-digital codeset identifier. After URC 2 has been programmed to use the correct codeset stored in codeset database 23, URC 2 is then able to send appropriate operational signals to control SAMSUNG DVD HD841.

In another example, codeset information 43 is the actual codeset of SAMSUNG DVD HD841. Instead of sending the codeset identifier, PC 3 sends the actual codeset of SAMSUNG DVD HD841 to URC 2. In this example, URC 2 does not need to store the entire codeset database 23 in memory 22. Instead, URC 2 receives the codeset from PC 3 and is programmed to use the codeset to control DVD HD841. The advantage of this method is that it saves memory space and reduces the cost of URC 2. URC 2 only needs to have enough memory to store one or a small number of codesets, as opposed to an entire database of codesets.

The above illustrated method is convenient because URC 2 is programmed automatically after the user selects the photograph of the electronic consumer device or its corresponding remote control device. However, a typical hand held remote control device is only capable of one-way transmission, i.e., it only emits operational signals to control electronic consumer devices. In order to receive codeset information 43 automatically, URC 2 has to be able to do two-way communication. In the example of FIG. 1, RCA jack 24 is included in URC 2. PC 3 sends out codeset information 43 onto RCA jack 35. URC 2 then receives codeset information 43 from RCA jack 24 through audio cable 30. Aside from an audio connection, serial communication or wireless communication may also be used between URC 2 and PC 3. Regardless of the type of communication, extra cost is required for URC 2 to receive codeset information 43.

This extra cost in receiving codeset information 43 is eliminated in the following example. As illustrated in FIG. 2, after the user confirms the selection of the image of SAMSUNG DVD HD 841 (step 53), PC 3 displays a three digit codeset identifier of HD 841 on display screen 30 (step 54A of FIG. 2). The User manually programs URC 2 by entering the displayed codeset identifier into URC 2 (step 55A of FIG. 2). URC 2 is then programmed to control SAMSUNG HD 841 using the codeset corresponding to the displayed codeset identifier. Although the user is still involved in manually programming URC 2, no extra cost is required to transmit the codeset identifier to URC 2.

Figure 5:
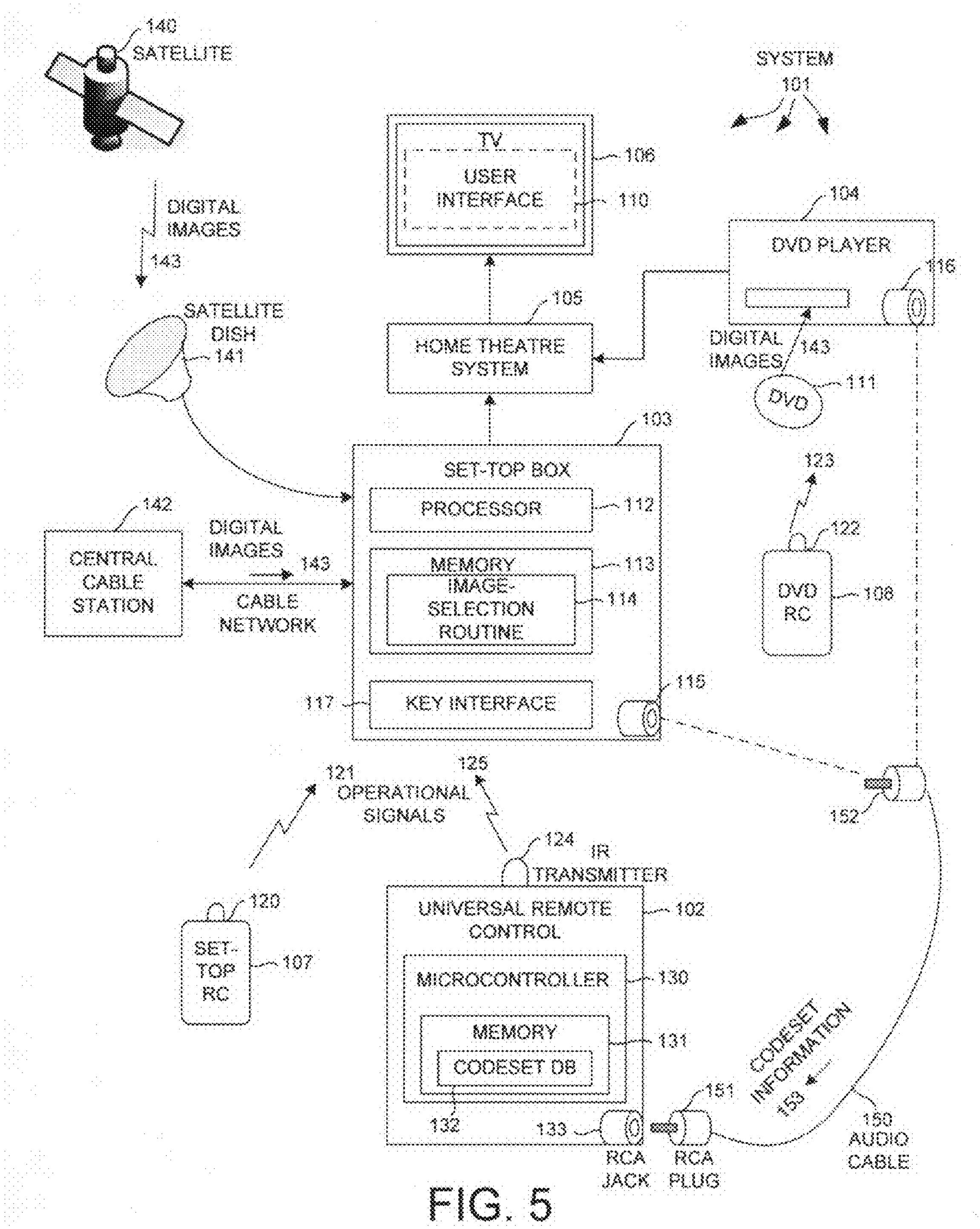
FIG. 5 illustrates a system in accordance with one novel aspect.

FIG. 5 is a diagram of a system 101 in accordance with one novel aspect. System 101 includes a universal remote control (URC) 102, a set-top box 103, a DVD player 104, an audio home-theatre system 105, and a TV 106. Set-top box 103 includes a processor 112, memory 113, a RCA jack 115, and a key interface 117. Memory 113 includes an image-selection routine 114. Set-top box 103 is either a satellite set-top box or a cable set-top box. A satellite set-top box communicates to a satellite 140 through a satellite dish 141. A cable set-top box communicates to a central cable station 142 through a cable network. Set-top box 103 is controlled by a set-top remote control device 107. Remote control device 107 emits operational signals 121 from IR transmitter 120 to control set-top box 103. DVD player 104 includes an audio OUT RCA jack 116. DVD player 104 is controlled by a DVD remote control device 108. Remote control device 108 emits operational signals 123 from IR transmitter 122 to control DVD player 104. URC 102 includes a microcontroller 130, memory 131, and an audio IN RCA jack 133. Memory 131 includes a codeset database 132. URC 102 emits operational signals 125 from IR transmitter 124 and is programmed to control a particular brand and make of electronic consumer device.

FIG. 5 illustrates a method of using DVD player 104 or set-top box 103 to program URC 102, as compared to the use of PC 3 in FIG. 1. In the example of using DVD player 104, a user inserts DVD optical disc 111 into DVD player 104. DVD player 104 plays DVD optical disc 111 and displays user interface 110 on TV 106. The user then uses DVD remote control device 108 to select a particular, brand and make of electronic consumer device. In the example of FIG. 5, digital images 143 represent digital image files of all electronic consumer devices and remote control devices. Digital images 143 are uploaded from DVD optical disc 111 and are displayed on the second selection menu, as illustrated in FIG. 4. After the user confirms the selection of SAMSUNG DVD HD841, codeset information 153 is then transmitted to URC 102. In the example of FIG. 5, codeset information 153 is transmitted through an audio cable 150 from DVD player 104 to URC 102. Audio cable 150 has two RCA plugs 151 and 152, which are plugged into RCA jack 133 of URC 102 and RCA jack 116 of DVD player 104. URC 102 receives codeset information 153 and is then programmed to control SAMSUNG DVD HD841 using the correct codeset. Alternatively, a codeset identifier of SAMSUNG HD841 is displayed on TV 106, and the user programs URC 102 by entering the codeset identifier into URC 102.

In the example of using a set-top box 103, the method of configuring URC 102 is the same as described above with two differences. First, image-selection routine 114 is stored inside set-top box 103. Processor 112 executes image-selection routine 114 and displays user interface 110 on TV 106 (sometimes TV 106 contains a built-in set-top box 103). The user then uses remote control 107 to make selections. In some situation, set-top box 103 contains a key interface 117, and the user used key interface 117 to make selections. Second, digital images 143 are not uploaded from a DVD disc. If set-top box 103 is a satellite set-top box, then digital images 143 are received from satellite 140 through satellite dish 141. If set-top box 103 is a cable set-top box, then digital images 143 are received from a central cable station 142 through a cable network. Therefore, this method eliminates the need of providing local storage of all the digital images or of an extra DVD disc for the user to configure URC 102.

URC 102 is not necessary a hand held remote control device. In one example, URC 102 is embedded inside set-top box 103. URC 102 is programmed the same way as illustrated above. The only difference is that codeset information 153 is internally transmitted to URC 102 within set-top box 103. After URC 102 has been programmed to control a particular electronic consumer device, set-top box 103 acts like an IR blaster to send out operational signals to control that particular electronic consumer device.

In one advantageous aspect, microcontroller 130 of URC 102 includes an on-chip analog-to-digital converter. The analog-to-digital converter is provided in the integrated circuit design of microcontroller 130 for use in other high-volume microcontroller applications (non-remote control device applications) of the microcontroller integrated circuit design. An analog input terminal of the microcontroller integrated circuit that is coupled to the input of the analog-to-digital converter is coupled to RCA jack 133 without substantial other interfacing circuitry between the microcontroller integrated circuit and the RCA jack. The analog-to-digital converter receives the signal on RCA jack 133, digitizes it, and the processor within microcontroller 130 analyzes the digitized information and recovers codeset information 153. Accordingly, the only significant cost that is added to the prior manufacturing cost of universal remote control 102 is the cost of providing the relatively inexpensive RCA jack 133. RCA audio OUT jacks are already customarily supplied on DVD players and set-top boxes and home theatre systems and therefore do not represent an added cost to the typical user.

The RCA jack and cable mechanism of communicating codeset information therefore is a very inexpensive way of providing the user with a new ability to download codeset information automatically into a remote control device.

Furthermore, the illustrated method of programming a universal remote control device is not limited to outputting codeset information. In the example of FIG. 5, besides codeset information, other device information including device description and device behavior characteristics can also be transmitted from set-top box 103 to URC 102. Device description contains device brand, model, year of manufacturer and other related details of the device. Device behavior characteristics contain operational behavior of the device such as whether the device requires "ENTER" key after DIGIT entry for channel selection, and how long it will take from receiving POWER signal to the completion of power on process.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A method for configuring a universal remote control device comprising:

displaying a plurality of images on a display monitor, wherein each image of the plurality of images is an image of a corresponding respective one of a plurality of different devices, wherein each of the plurality of different devices is taken from the group consisting of: an electronic consumer device, and a remote control device usable to control an electronic consumer device, and wherein the plurality of images is displayed on the display monitor in a prioritized order based on a determined market popularity of the corresponding plurality of different devices;

receiving a selection of a one of the plurality of images displayed on the display monitor, wherein the one of the plurality of images selected is an image corresponding to a particular one of the plurality of different devices;

outputting codeset information associated with the particular one of the plurality of different devices, wherein the codeset information is taken from the group consisting of: a codeset and an identifier of a codeset; and using the output codeset information associated with the particular one of the plurality of different devices in the universal remote control device to thereby configure the universal remote control device to command functional operations of the particular one of the plurality of different devices.

2. The method of claim 1, wherein the step of using involves keying into the universal remote control device the identifier of a codeset as displayed on the display monitor.

3. The method of claim 1, wherein the step of using involves loading the codeset information into the universal remote control device.

4. The method of claim 1, wherein a video output device outputs video that is displayed on the display monitor, wherein a viewer of the plurality of images displayed on the display monitor uses a user input device to communicate with the video output device and to select said one of the plurality of images, and wherein the user input device is taken from the group consisting of: a remote control device, and a key interface on the video output device.

5. The method of claim 4, wherein the video output device is taken from the group consisting of: an Internet Protocol TV, a satellite set-top box, a cable set-top box, an audio/video set-top box, a digital video disc (DVD) player, a digital video recorder, a media hub, a game console, and a personal computer.

6. The method of claim 4, further comprising:

receiving a plurality of digital images onto the video output device, wherein each one of the plurality of digital images corresponds to a respective one of the plurality of images displayed on the display monitor, wherein the plurality of digital images is received onto the video output device at the same time that the video output device is outputting video that is displayed on the display monitor.

7. The method of claim 6, wherein the plurality of digital images is received onto a satellite set-top box from a satellite dish.

8. The method of claim 6, wherein the plurality of digital images is received onto a cable set-top box from a cable television network cable.

9. The method of claim 6, wherein a plurality of digital images is stored on a set-top box, wherein each digital image of the plurality of stored digital images corresponds to a respective one of the plurality of images displayed on the display monitor.

10. The method of claim 9, wherein the stored digital images are files of compressed image data.

11. The method of claim 1, wherein a viewer of the plurality of images uses a user input device to communicate with the device monitor and to select said one of the plurality of images, and wherein the user input device is taken from the group consisting of: a remote control device, and a key interface on the display monitor.

12. The method of claim 1, wherein the display monitor is a display of a personal computer, and wherein a viewer of the plurality of images uses the personal computer to make the selection that is then received onto the personal computer.

13. The method of claim 12, further comprising:

receiving a plurality of digital images onto the personal computer, wherein each one of the plurality of received digital images corresponds to a respective one of the plurality of images displayed on the display monitor, and wherein the plurality of received digital images is received onto the personal computer from a network connection.

14. The method of claim 12, further comprising:

receiving a plurality of digital images onto the personal computer, wherein each one of the plurality of received digital images corresponds to a respective one of the plurality of images displayed on the display monitor, wherein the plurality of received digital images is received onto the personal computer via a removable storage device, and wherein the plurality of received digital images is stored on the removable storage device.

15. The method of claim 1, wherein each of the plurality of images displayed on the display monitor is a digital photograph.

16. The method of claim 1, wherein the display monitor comprises a television set.

17. The method of claim 1, wherein the step of using involves communicating the codeset information across an audio connector, wherein the audio connector is taken from the group consisting of: an audio jack, and an audio plug.

* * * * *